United States Patent [19]

Stratton et al.

[11] Patent Number: 4,627,957
[45] Date of Patent: Dec. 9, 1986

[54] NUCLEAR FUEL ROD WITH POROUS PLUG CLOSURE

[75] Inventors: Richard W. Stratton, Windisch; Michel Nicolet, Baden; Glenn Andrews, Grand-Lancy, all of Switzerland

[73] Assignee: Gesellschaft zur Forderung der Industrieorientierten Forschung an den Schweizerischen Hochschulen und Weiteren Institutionen, Berne, Switzerland

[21] Appl. No.: 647,251

[22] Filed: Aug. 31, 1984

Related U.S. Application Data

[63] Continuation of Ser. No. 320,099, Nov. 10, 1981, abandoned.

[30] Foreign Application Priority Data

Jan. 20, 1981 [CH] Switzerland .................... 348/81

[51] Int. Cl.$^4$ ............................................. G21C 3/18
[52] U.S. Cl. ..................................... 376/412; 376/456
[58] Field of Search ............. 376/456, 412, 455, 426, 376/420, 425, 428, 429

[56] References Cited

U.S. PATENT DOCUMENTS

| | | | |
|---|---|---|---|
| 3,573,168 | 3/1971 | Campbell | 376/456 |
| 3,697,377 | 10/1972 | Gauthron | 376/456 |
| 3,801,447 | 4/1974 | Heenan | 376/456 |
| 3,953,288 | 4/1976 | Johnson | 376/456 |
| 3,996,100 | 12/1976 | Oguma et al. | 376/456 |
| 4,036,691 | 7/1977 | Meadowcroft et al. | 376/412 |
| 4,163,689 | 8/1979 | Grossman et al. | 376/456 |

OTHER PUBLICATIONS

"Lectures on Fast Reactors", Karl Wirtz, available from A.N.S., La Grange Park, Ill. 60525, U.S.A., pp. 191, 192.

*Primary Examiner*—Harvey E. Behrend
*Attorney, Agent, or Firm*—Karl F. Ross; Herbert Dubno

[57] ABSTRACT

A tubular sheath for particulate nuclear fuel has microporous retaining elements formed by winding metal strip about a central pin and pushing the resulting spiral into the sheath ends. The metal strip has transverse grooves formed by a photo-etching process which form axial gas passages narrow enough to prevent passage of fuel particles. Suitable materials for the strip include molybdenum and tungsten. A stainless steel strip can be used if a molybdenum or tungsten disc is placed between it and the fuel.

5 Claims, 7 Drawing Figures

NUCLEAR FUEL ROD WITH POROUS PLUG CLOSURE

This is a continuation of co-pending application Ser. No. 320,099 filed on Nov. 10, 1981, now abandoned.

BACKGROUND OF THE INVENTION

The most recent developments in the field of nuclear fuels have concerned particulate material in the form of microspheres or powder or sintered pellets of uranium or plutonium oxide, carbide or nitride, or even pellets containing actinides other than uranium or plutonium. This particulate material, whether sintered or not, is contained in tubes of a metal alloy of the type generally used for the manufacture of nuclear fuel sheaths, having a length of 1 to 3 meters and a diameter of 6 to 14 mm, filled to a certain level, the remaining space being designed to receive the gas released during fission of the fuel. The portion of the tube containing the fuel is closed by respective microporous retaining elements disposed at both ends. This element must be made of a material which is compatible with the fuel and with the metal alloy of the tube. This material is preferably refractory and non-reactive. It must be possible for this element to slide in the tube while ensuring complete closure of the portion of the tube containing the fuel and the element must be porous in order to enable the axial diffusion of gas through the microporous retaining element both during filling of the tube and to enable the gaseous fission products to escape into the chamber designed to receive them. The pore size must be less than the size of the smallest particles, approximately 20 to 30$\mu$, in order to prevent any fuel leakage from the portion of the tube in which it is contained during transport and handling as well as during filling during which the tube is subjected to vibrations of 20 to 100 Hz.

OBJECT OF THE INVENTION

The object of the present invention is to satisfy all the conditions listed above.

SUMMARY OF THE INVENTION

The present invention provides a tubular sheath, in particular for a nuclear fuel in the form of sintered or non-sintered particles, which is axially closed by microporous retaining elements, wherein these retaining elements have the form of strips wound in adjacent turns in a coil about a central pin and the periphery of the coil is force fitted in the tubular sheath, a plurality of passages being provided in an axial direction between the adjacent turns, at least one of the dimensions of the cross-section of theses passages being smaller than the size of the smallest particles of the fuel.

This invention also relates to a method of manufacturing this sheath, in which the passages are grooves and in order to form these grooves a photosensitive protective layer is deposited on one of the faces of the strip, this layer is exposed to light radiation through a mask having an image of the network of grooves to be formed on this face of the strip, the layer exposed to light in this way is developed, the portions from which the protective layer has been removed are chemically etched to a predetermined depth, and the remainder of the layer is dissolved.

BRIEF DESCRIPTION OF THE DRAWING

The accompanying drawing shows by way of example an embodiment and a variant of the tubular sheath of the invention and a mode of carrying out the manufacturing method for this sheath. In the drawing.

SPECIFIC DESCRIPTION

Figure 1:
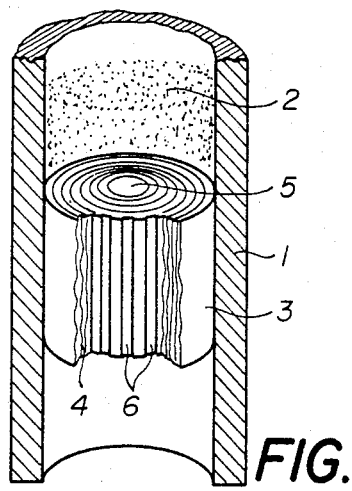
FIG. 1 is a partial sectional view in perspective with the sheath broken away.
Figure 2:
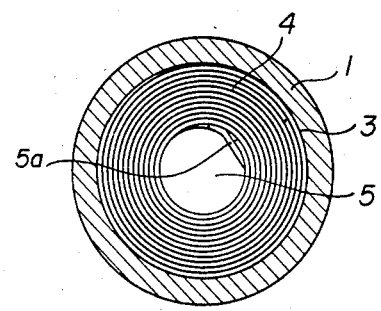
FIG. 2 is a transverse cross-section through the sheath at the location of one of the retaining elements.

The tubular sheath shown in FIG. 1 comprises a stainless steel tube 1 which may have a length of between 1 and 3 meters and a diameter of between 6 and 14 mm. This tube 1 has a portion containing nuclear fuel 2 in the form of sintered or non-sintered microspheres or powder of uranium or plutonium oxide, carbide or nitride. This fuel 2 is retained in this portion of the tube by two retaining elements 3, one of which is shown in FIG. 1, constituted by a metal strip 4 spirally wound about a central pin 5 provided with a chordal flat 5a. One of the faces of the strip 4 has passages 6 extending transversely to the strip 4 and therefore parallel to the axis of the tube 1 when this strip has been fitted therein after having been wound spirally about the central pin 5 (FIG. 2). It is evident that the depth of the channels 6 in the strip and therefore their radial dimension, once this strip has been helically wound, should not exceed the size of the smallest particles of the fuel 2 in order to prevent any loss of the fuel under any circumstances.

As mentioned above, the material used for the strip should also satisfy several other conditions, which may be satisfied in particular by molybdenum and tungsten as will be shown in further detail in the following description.

Given that the conditions of use of the fuel involve a range of temperatures of between 600° and 1200° C., it should be possible to use molybdenum and tungsten bearing in mind their physical properties in comparison with those of steel (see Table I).

TABLE I

| Material | Young's Modulus E (GPa) A.T. | Young's Modulus E (GPa) 800° C. | Bending Strength (MPa) | Tensile Strength (MPa) A.T. | Tensile Strength (MPa) 600° C. | Tensile Strength (MPa) 1200° C. | Density (g · cm$^{-3}$) |
|---|---|---|---|---|---|---|---|
| Molybdenum | 3.24 | 2.76 | 600 | 800 | 700 | 400 | 10.2 |
| Tungsten | 4.07 | — | — | 1470 | 530 | 400 | 19.3 |
| Stainless Steel | 1.90 | 1.24 | 250 | 640 | 340 | — | 7.9 |

| | Thermal Conductivity Cal/sec/cm$^2$ | Linear Expansion | Effective neutron absorption cross- | Coefficient of friction (static, with |

TABLE I-continued

| Material | 1 cm/°C. 500–1200° C. | Coefficient Per °C. | section (thermal) (Barns) | stainless steel) |
|---|---|---|---|---|
| Molybdenum | 0.275–0.239 | $6.28 \times 10^{-6}$ | 2–3 | 0.6 |
| Tungsten | 0.288–0.268 | $4.45 \times 10^{-6}$ | 19 | 0.6 |
| Stainless steel | 0.039 | $12.3 \times 10^{-6}$ | 2–3 | — |

It can be seen from the table that these materials have good properties of resistance to high temperatures. With respect to the effective neutron absorption cross section, molybdenum is comparable with stainless steel, whereas tungsten has a very high value corresponding to that of a good protection material.

Bearing in mind the variation between the linear expansion coefficient of steel and those of molybdenum on one hand, and tungsten on the other hand, it is useful to calculate, using a practical example, whether this variation is compatible with the expansion of the stainless steel tube 1. The expansion of the retaining element may be calculated by assuming a mean temperature of 900° C. between 600° C. and 1200° C., representing the temperature gradient between the gas produced during fission and the wall of the cooled tube, using the following equation:

$$\frac{r_1}{r_2} = \frac{1 + a'T_1}{1 + a'T_2}$$

wherein:
$r_1$ is the initial radius
$r_2$ is the radius after expansion
$a'$ is the linear expansion coefficient
$T_1$ is the ambient temperature
$T_2$ is the operating temperature.

For a tube having an internal diameter of 6 mm, the molybdenum retaining element will have the following expansion:

$$r_2 = \frac{1 + 6.28 \times 10^{-6}(900)}{1 + 6.28 \times 10^{-6}(20)} = 3.0166 \text{ mm.}$$

For a tungsten retaining element, the same calculation gives a radius after expansion of 3.0117 mm.

The expansion of the tube may be calculated with reference to its internal diameter given by 2 r. If the same equation is used again and if a wall temperature of 600° C. is assumed, the value of the radius of the tube after expansion is $$r_2 = \frac{1 + 12.3 \times 10^{-6}(600)}{1 + 12.3 \times 10^{-6}(20)} = 3.0214 \text{ mm.}$$

The difference in expansion between the tube 1 and the retaining elements 3 is 0.5 hundredths of a mm in the case of molybdenum and 1 hundredth of a mm in the case of tungsten. This difference remains within limits allowing it to be compensated by elastic expansion of the turns of the retaining element 3.

Figure 4:
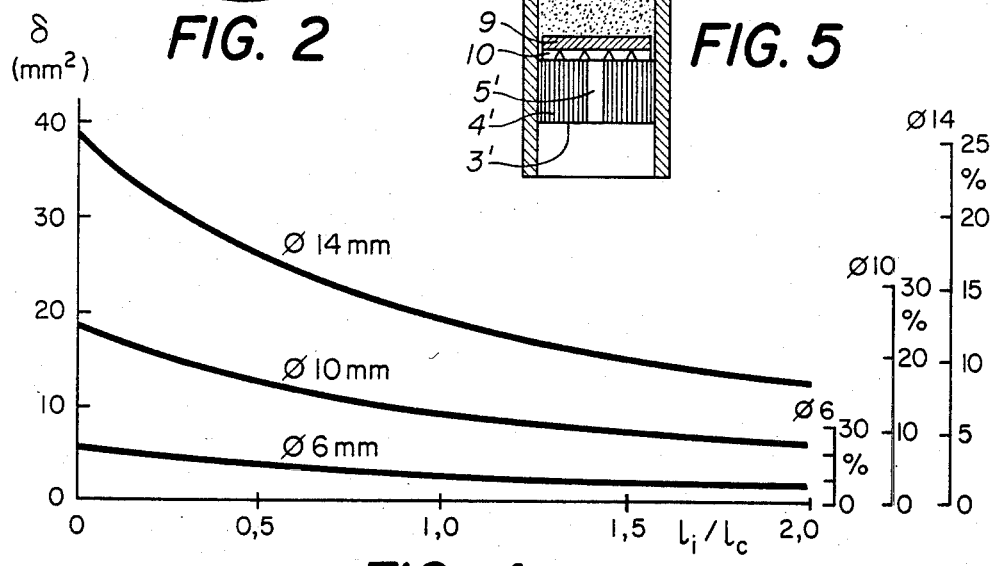
FIG. 4 is a diagram showing the effect of the relationship between the spacing of the passages and their length on the porosity of the retaining element.

The porosity of the retaining element 3 should be of the same order of magnitude as that of the particulate fuel which is between 11 and 23%. As mentioned above, the radial dimension of the porous regions provided between the adjacent turns should not exceed 20 microns in view of the size of the finest particles of the fuel. Consequently the thinner the spirally wound strip, the greater is the porosity. This porosity may theoretically be 20 microns multiplied by the length of the strip forming the spiral. However it is not possible to maintain a constant spacing between the turns of the strip. For this reason it is proposed in accordance with the invention to provide passages 6 transverse to the strip 4 using a photo-etching technique. The diagram of FIG. 4 shows three curves showing the variation in surface area S in mm² of the channels as a function of the length ratio $l_i/l_c$ of the nonetched portions and the etched portions, for retaining elements 3 having respective diameters of 6, 10 and 14 mm and a strip thickness of 0.076 mm, corresponding to a commercially available molybdenum strip. The right-hand side of this diagram shows three scales illustrating the percentage porosity of these retaining elements having a diameter of 6, 10 and 14 mm respectively. It is noted that the percentage porosity for a $l_i/l_c$ ratio of 1 corresponds in all three cases to the order of magnitude of porosity of the fuel itself which is between 11 and 23%.

Figure 3A:
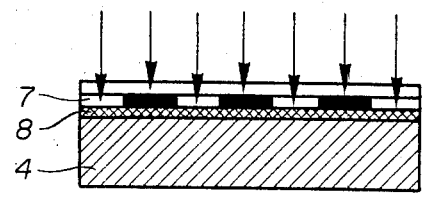
FIGS. 3a to 3c are sectional views which show various stages of the manufacturing method for a retaining element.
Figure 3B:
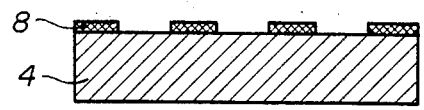
Figure 3C:
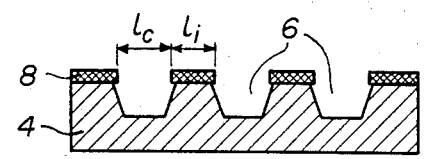

The photo-etching technique used to produce the transverse passages 6 on one of the faces of the strip 4 is known. It comprises producing an enlarged scale drawing of the desired image or of a portion of this image if it is composed of a repeated motif. This drawing is then reduced to the desired size and a photographic film 7 (FIG. 3) of this image brought to its actual scale is produced. This film 7 forms a stencil or mask which is placed on the strip 4 whose face adjacent to the film 7 has been preliminarily coated with a layer 8 of photosensitive resin. This resin may be of positive or negative action, the exposed surface remaining after development in the first case and being lost in the second case. The sensitization of the majority of resins is obtained by means of an UV light source, but it is possible to choose resins which are sensitive to other wave lengths. Polymerization of the resin takes place when it is exposed to radiation of a suitable wave length. After development of this layer 8, the non-protected surface of the strip 4 may be etched in the chemical etching solution whose concentration and temperature enable the depth of etching to be controlled. In the case of molybdenum, the solution for the chemical etching is constituted by one part by volume of concentrated nitric acid, one part by volume of concentrated sulphuric acid and three parts by volume of water. In the case of tungsten a hydrofluoric acid solution is used with an electrochemical process.

The removal of the resin used for protection during the chemical etching process may then be obtained by means of a solvent suited to the type of resin used, after which the strip is carefully washed in order to remove any trace of the chemical products used.

Once the strip has been etched, one of its ends must be spot welded to the flat 5a of the central pin 5. Although it is possible to obtain a weld between a strip of molybdenum and a central pin 5 of molybdenum or tungsten, it is preferable to interpose a tantalum sheet having a thickness of 0.10 mm between the pin and the strip. The best welding results are obtained with an intermediate sheet of nickel, but the maximum operating temperature of 1200° C. is too close to the melting point of nickel which is 1453° C. In addition a serious risk may be produced by the formation of intermetallic compounds which fracture, between the nickel and the molybdenum or tungsten. It is possible to envisage fusion welding of the molybdenum or tungsten using an electron gun.

The strip 4 may be wound on the pin 5 using simple means comprising a motor designed to rotate the pin 5 and a weight attached to the free end of the strip 4 in order to tauten the strip and obtain a winding with adjoining turns. A relatively low speed of rotation is selected so as to prevent rapid starting from breaking the weld. The weight fixed to the strip is 2 kg and is fixed by means of a wire and a special gripper which maintains the strip in a horizontal plane. In order to guide the strip and prevent it from forming a conical winding by offsetting of the edges, the wire connecting the weight to the strip is guided by a grooved pulley which may be axially adjustable.

When the winding has been completed, it is placed in a clamp chunk formed by two semi-circular jaws corresponding to the diameter of the retaining element 3 desired. These jaws are clamped about the retaining element 3 while the strip 4 is still under tension and several centimeters of the strip remain to be wound. The winding is continued as far as possible and the gripper for fixing the weight is removed so that the remainder of the strip may be finally wound in the chuck. In order to prevent a space of more than 20 microns from arising between the tube and the retaining element 3, the thickness of the outer end of the strip 4 is formed so as to progressively decrease.

The retaining element is then pushed towards the end of the chuck by means of a tubular push rod whose external diameter is slightly smaller than that of the chuck and whose internal diameter is slightly greater than that of the central pin 5. The external portion of the clamp chuck jaws is conical in order to facilitate its coaxial positioning adjacent to one of the ends of the tube 1 for the transfer of the retaining element 3 i.e., the tightened coil, into this tube which is carried out by means of a push rod similar to that used previously in order to bring the retaining element to the end of the chuck.

Figure 5:
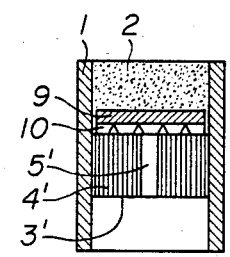
FIG. 5 is an axial section showing a variant of the embodiment of FIG. 1.

Bearing in mind the difficulties which arise when working with molybdenum or tungsten, it is possible, by way of a variant, to construct a retaining element 3' (FIG. 5) constituted by a strip 4' of stainless steel wound about a central pin 5', a molybdenum or tungsten disc 9 then being interposed between the fuel 2 and the retaining element 3'. This disc 9 is used to form a heat barrier designed to reduce the temperature gradient between the nuclear fuel and the retaining element 3' so as to prevent the formation of hot spots and therefore enable the use of stainless steel. A network of channels 10 is preferably etched on the face of the disc 9 adjacent to the retaining element 3'. As a variant this disc may also be obtained by sintering so as to provide it with sufficient porosity for the passage of the gases towards the channels of the retaining element 3'. A disc of this type, whether sintered or not, has a thickness of some tenths of a millimeter and, in particular if it is not sintered and consequently porous, it will have a diameter of some hundredths of a millimeter less than the internal diameter of the sheath 1 so as to enable the gases resulting from fission to flow in an annular manner towards the retaining element 3', the network of channels 10 of the disc 9 enabling the gases to reach the channels 6 of this retaining element 3'.

We claim:

1. A nuclear fuel rod comprising:
   a metal cladding tube;
   a body of nuclear fuel in said tube in the form of particles; and
   a porous plug closing at least one end of said tube and comprising:
   a central pin, and
   a metal non-porous strip, spirally wound around said pin in a tightened coil, the adjacent turns of which being freely slidable against each other under intrinsic elasticity of said tightened coil, the diameter of which corresponding substantially to the inside diameter of said cladding tube so that the said tightened coil can be fitted into said cladding tube and maintained in a tightened coil by the wall of said tube, said tightened coil being elastically expanded by sliding of said turns when the inside diameter of said tube thermally expands by heating, said strip being formed on at least one surface with channels defining a plurality of passages extending in an axial direction with respect to said tube between successive turns, said passage each having a maximum radial dimension of about 20 microns and at least one of the dimensions of the cross section of said passages being smaller than the size of the finest particles of the fuel.

2. The nuclear fuel rod defined in claim 1 wherein said passages are formed by transverse grooves on only one face of said strip, sidewalls of said grooves acting as spacers between said turns in the tightened coil.

3. The nuclear fuel rod defined in claim 1 wherein said central pin has a flat section provided along a chord to which one end of said strip is welded.

4. The nuclear fuel rod defined in claim 1 wherein the thickness of a portion of said strip adjacent an end of said coil against the wall of said tube decreases progressively toward said end of said coil.

5. The nuclear fuel rod defined in claim 1 wherein said strip is composed of a metal having substantially the same coefficient of linear expansion with temperature as said tube.

* * * * *